(12) United States Patent  
Klein et al.

(10) Patent No.: US 8,452,538 B2  
(45) Date of Patent: May 28, 2013

(54) PETROPHYSICAL EVALUATION OF SUBTERRANEAN FORMATIONS

(75) Inventors: James D. Klein, Tucson, AZ (US); David A. Schoderbek, Eagle River, AK (US); Jason M. Mailloux, Laramie, WY (US)

(73) Assignee: ConocoPhillips Company, Houston, TX (US)

(*) Notice: Subject to any disclaimer, the term of this patent is extended or adjusted under 35 U.S.C. 154(b) by 378 days.

(21) Appl. No.: 12/861,485

(22) Filed: Aug. 23, 2010

(65) Prior Publication Data

US 2011/0054795 A1    Mar. 3, 2011

Related U.S. Application Data

(60) Provisional application No. 61/237,568, filed on Aug. 27, 2009.

(51) Int. Cl.
*G06F 19/00* (2011.01)
*G01V 3/18* (2006.01)

(52) U.S. Cl.
USPC .............................................................. 702/7

(58) Field of Classification Search
USPC .... 702/7, 11, 13; 703/10; 166/254.2; 367/73, 367/83
See application file for complete search history.

(56) References Cited

U.S. PATENT DOCUMENTS

2003/0105590 A1* 6/2003 Mollison et al. ............... 702/7
2011/0144913 A1* 6/2011 Klein et al. .................. 702/13

OTHER PUBLICATIONS

Barbara I. Anderson, Timothy S. Collett, Richard E. Lewis and Isabelle Dubourg, "Using Open Hole and Cased-Hole Resistivity Logs to Monitor Gas Hydrate Dissociation During a Thermal Test in the Mallik 5L-38 Research Well, Mackenzie Delta, Canada", Petrophysics, Jun. 2008, vol. 49, No. 3, pp. 285-294.
G.E. Archie, "The Electrical Resistivity Log as an Aid in Determining Some Reservoir Characteristics", Journal of Petroleum Technology, Jan. 1942, vol. 5, pp. 54-62.
Ray Boswell, Robert Hunter, Timothy Collett, Scott Digert, Steve Hancock, Micaela Weeks, "Investigation of Gas Hydrate-Bearing Sandstone Reservoirs at the "Mount Elbert" Stratigraphic Test Well, Milne Point, Alaska", Proceedings of the 6th International Conference on Gas Hydrates, 2008, Jul. 6-10, 2008, 9 pages.
Timothy S. Collett, "Well Log Evaluation of Gas Hydrate Saturations", SPWLA 39th Annual Logging Symposium, May 26-29, 1998, pp. 1-14.
Timothy S. Collett, "A Review of Well-Log Analysis Techniques Used to Assess Gas-Hydrate-Bearing Reservoirs", AGU, Geophysical Monograph 124, 2001, pp. 189-210.
Carmen T. Gomez, Jack Dvorkin, and Gary Mavko, "Estimating the Hydrocarbon Volume From Elastic and Resistivity Data: A Concept", Stanford University, The Leading Edge, Jun. 2008, pp. 710-718.

(Continued)

*Primary Examiner* — Bryan Bui
(74) *Attorney, Agent, or Firm* — ConocoPhillips Company

(57) ABSTRACT

Methods and systems are provided for evaluating petrophysical properties of subterranean formations and comprehensively evaluating hydrate presence through a combination of computer-implemented log modeling and analysis. Certain embodiments include the steps of running a number of logging tools in a wellbore to obtain a variety of wellbore data and logs, and evaluating and modeling the log data to ascertain various petrophysical properties. Examples of suitable logging techniques that may be used in combination with the present invention include, but are not limited to, sonic logs, electrical resistivity logs, gamma ray logs, neutron porosity logs, density logs, NRM logs, or any combination or subset thereof.

30 Claims, 3 Drawing Sheets

OTHER PUBLICATIONS

A. Graue, B. Kvamme, J. Stevens, J. Howard, "Magnetic Resonance Imaging of Methane—Carbon Dioxide Hydrate Reactions in Sandstone Pores", SPE International, SPE 102915, 2006, pp. 1-13.

Robert G. Keyes and Shiyu Xu, "An Approximation for the Xu-White Velocity Model", Geophysics, vol. 67, 2002, pp. 1406-1414.

Guy T. Kuster and M. Nafi Toksoz, Velocity and Attenuation of Seismic Waves in Two-Phase Media: Part II. Experimental Results, Geophysics, vol. 39, No. 5, Oct. 1974, pp. 607-618.

Keith A. Kvenvolden, Gas Hydrates—Geological Perspective and Global Change, American Geophysical Union, May 1993, pp. 173-187.

S.R. Dallimore, T. Uchida M.W. Lee, and T.S. Collet, Amount of Gas Hydrate Estimated from Compressional-and Shear-Wave Velocities at the JAPEX/JNOC/GSC Mallik 2L-38 Gas Hydrate Research Well, U.S. Geological Survey, 1999, pp. 313-322.

Myung W. Lee and Timothy S. Collett, "Controls on the Physical Properties of Gas-Hydrate-Bearing Sediments Because of the Interaction Between Gas Hydrate and Porous Media", Scientific Investigations Report, 2005, vol. 124.

M. Miyariri, K. Akihisa, T. Uchida, T.S. Collett and S.R. Dallimore, Well-log Interpretation of Gas-Hydrate-Bearing Formations in the JAPEX/JNOC/GSC Mallik 2L-38 Gas Hydrate Research Well, Mackenzie Delta, Northwest Territories, Canada, 2002, Bulletin 544, pp. 281-293.

C.F. Pearson, P.M. Halleck, P.L. McGuire, R. Hermes, and M. Mathews, "Natural Gas Hydrate Deposits: A Review of In Situ Properties", Journal of Physical Chemistry, 1983, vol. 87, pp. 4180-4185.

Stephen Prensky, "A Review of Gas Hydrates and Formation Evaluation of Hydrate-Bearing Reservoirs", SPWLA 36th Annual Logging Symposium, Jun. 1995, pp. 1-12.

Wikipedia, Oct. 6, 2010, "Methane Clathrate", pp. 1-10.

James C. Stevens, James J. Howard, Bernie A. Baldwin, Geir Ersland, Jarle Husebo and Arne Graue, "Experimental Hydrate Formation and Gas Production Scenarios Based on CO2 Sequestration", Proceedings of the 6th International Conference on Gas Hydrates, 2008, pp. 1-7.

Frank Williams, Mike Lovell, Tim Brewer, Christian Buecker, Peter Jackson, Ameena Camps, "Formation Evaluation of Gas Hydrate Bearing Sediments", SPWLA 49th Annual Logging Symposium, 2008, pp. 1-12.

Thomas E. Williams, Keith Millheim and Bill Liddell, "Methane Hydrate Production from Alaskan Permafrost", Mauer Technology Inc. Anadarko Petroleum Corp, Mar. 2005, pp. 1-203.

Wood, A.B., 1941, "Three phase Wood Equation", pp. 1-2.

Shiyu Xu and Roy White, "Poro-Elasticity of Clastic Rocks: A Unified Model", SPWLA 26th Annual Logging Symposium, Jun. 1995, pp. 1-12.

Timothy S. Collett and John Ladd, "Detection of Gas Hydrate with Downhole Logs and Assessment of Gas Hydrate Concentrations (Saturations) and Gas Volumes on the Blake Ridge with Electrical Resistivity Log Data", Proceedings of the Ocean Drilling Program, Scientific Results, vol. 164, pp. 1-25 (Sep. 23, 2010).

Reinhard Hesse, Shaun K. Frape, Per K. Egeberg, and Ryo Matsumoto, "Stable Isotope Studies (C1, O, and H) of Interstitial Waters from Site 997", Blake Ridge Gas Hydrate Field, West Atlantic, Proceedings of the Ocean Drilling Program, Scientific Results, vol. 164, pp. 129-137 (2000).

R.L. Kleinberg, C. Flaum, D.D. Griffin, P.G. Brewer, G.E. Malby, T.E. Peltzer and J.P. Yesinowski, Deep Sea NMR: Methane Hydrate Growth Habit in Porous Media and Its Relationship to Hydraulic Permeability, Deposit Accumulation, and Submarine Slope Stability, Journal of Geophysical Research, vol. 108, 2508, 17 pp. (Oct. 29, 2003).

R.L. Kleinberg, C. Flaum, and T.S. Collett, Magnetic Resonance log of JAPEX/JNOC/GSC et al. Mallik 5L-38 Gas Hydrate Production Research Well: Gas Hydrate Saturation, Growth Habit, and Relative Permeability, 585, p. 114 (2005).

Keith A. Kvenvolden, "Methane Hydrate—A Major Reservoir of Carbon in the Shallow Geosphere?" Chemical Geology 71, pp. 41-51 (Dec. 15, 1988).

M.W. Lee, D.R. Hutchinson, T.S. Collett, and W.P. Dillon, Seismic Velocities for Hydrate-Bearing Sediments Using Weighted Equation, American Geophysical Union, pp. 347-358, (Sep. 10, 1996).

* cited by examiner

PETROPHYSICAL EVALUATION OF SUBTERRANEAN FORMATIONS

CROSS REFERENCE TO RELATED APPLICATION

This nonprovisional application claims priority to and the benefit of the provisional application, titled, "Method for Determining Probable Hydrate Formation Locations," U.S. Ser. No. 61/237,568, filed on Aug. 27, 2009.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of DOE Cooperative Agreement No. DE-NT0006553 awarded by the Department of Energy.

FIELD OF THE INVENTION

The present invention relates generally to methods and systems for evaluating petrophysical properties of subterranean formations. More particularly, but not by way of limitation, embodiments of the present invention include methods and systems for evaluating petrophysical properties of subterranean formations and comprehensive evaluation of hydrate presence through a combination of computer-implemented log modeling and analysis.

BACKGROUND

Gas hydrates resources in subterranean formations have been estimated to represent more than twice the energy of all known coal, oil and gas. In spite of this large quantity of in-place hydrate resources, current extraction efforts have not yet led to widespread exploitation of gas hydrates from subterranean formations.

Gas hydrates or clathrates, as they are commonly known, are a mixture of water and gas, where the water forms a rigid, cage-like structure that is filled with a gas molecule. Most commonly, the gas is biogenic methane, but can be thermogenic methane, $CO_2$, and occasionally other hydrocarbon gasses such as ethane.

Gas hydrates are naturally occurring, but are only stable within a limited range of temperature and pressure conditions, known as the gas hydrate stability zone (GHSZ). Hydrates are found in clastic marine sediments, siltstones, unconsolidated sands, and poorly cemented sandstones and conglomerates. The temperature and pressure restrictions limit hydrate formation to some ocean sediments and onshore sediments of the permafrost regions of the Arctic.

There are three known forms of gas hydrates: structure I, structure II and structure H. Structure I and structure II hydrates are by far the most common, while structure H hydrates are extremely rare and will not be addressed further here.

A structure I or structure II gas hydrate in a sandstone with 38% porosity and 85% hydrate saturation would have a gas yield at standard temperature and pressure (STP) of 164 $m^3/m^3$ of gas hydrate. This would also result in 0.8 $m^3$ of water at STP. It is unclear how much methane is trapped in all gas hydrates worldwide, with some estimates ranging from 3,114 to 7,634,000 trillion $m^3$. The main reason for this extremely large range of estimates is that there are several unknown factors including: the lateral extent of gas hydrate deposits, the reservoir porosity, reservoir thickness, and the level of saturation of methane in a given deposit. Part of the reason for these uncertainties is because core is extremely difficult to recover and accurately measure in a laboratory setting as it must be kept at freezing temperatures to prevent the hydrate from dissociating.

The primary interest in gas hydrates is due to the aforementioned large quantity of methane that is contained by them. A significant research initiative has been implemented to find a way to produce this methane in an economically favorable manner. As previously mentioned, it has been estimated that the total energy corresponding to the natural gas trapped in hydrate reservoirs is more than twice the energy of all known coal, oil and gas. It is important to note that gas hydrates are not a new phenomenon and have been studied since the 1970's, but were seen primarily as a drilling hazard. Blowouts, fires, and collapsed casing have occurred when drilling through hydrate zones. Gas hydrates have also been known to cause blockages in flow lines and pipelines in Arctic and deepwater marine regions. In submarine regions, slides and slumps on continental margin slopes are a significant geologic hazard. Methane hydrates are also considered a potential factor in climate change due to methane's status as a powerful greenhouse gas and the abundant amount of carbon that is associated with these enormous amounts of gas hydrate.

To produce methane from gas hydrates, the dynamics of how and where they form must be understood. It has been previously shown that gas hydrates are primarily pore-filling rather than grain coating, and therefore greatly reduce permeability. This fact is important because the relative permeability of formations is critically dependent on how hydrate forms in the pore space of rock and sediment, with permeability being one of the most important factors in being able to produce methane from gas hydrate deposits. For example, in a 1.1 Darcy core, permeability was reduced to a few mD at high levels of hydrate saturation (~62%).

One interesting aspect of hydrate formation is that they exclude salts from the ice lattice when they form. The fate of these ions, however, is a mystery. If they were to concentrate in any remaining water, one would expect a reduced resistivity of formation water ($R_w$) in hydrate bearing intervals as compared to water saturated sands above and below the hydrate interval; however, this is not the case. In one well that was studied, water resistivity ($R_w$) was back-calculated from the NMR hydrate saturation and the hydrate bearing intervals actually had a slightly elevated $R_w$ compared to the surrounding water sand intervals (0.20-0.50 versus 0.20-0.30, respectively). This difference could be a product of ion migration or it could mean that the ions are trapped in or around the hydrate lattice and are effectively bound. This would render the ions unable to conduct electrical current and thus not allow the ions to be recognized by electrical resistivity logging.

The failure to exploit large reserves of gas hydrates is due in part to the ineffectiveness of current methods for detecting and evaluating the petrophysical properties of a formation and the presence of hydrates in subterranean formations as a function of depth. One example of a conventional method for evaluating the petrophysical properties of a formation is taking a core sample. Of the conventional methods, core sampling can provide the most detailed information about a formation's petrophysical properties. Unfortunately, taking core samples is a time-consuming, laborious, and costly process, fraught with numerous technical complications and pitfalls. Additionally, core samples often require intensive laboratory analysis and hence, high costs and delays. Often, taking a full core sample of a wellbore is simply not feasible, particularly for deep and highly deviated wells.

Measurement of gas content in drilling mud is a common means of determining presence of gas in a formation, and in distinguishing permafrost ice from hydrates. This is an important measurement since the gas hydrate stability zone can overlap with depths where permafrost exists.

Sampling while drilling is another common technique to ascertain petrophysical properties of a formation. Again, this conventional method suffers from significant limitations, particularly with respect to the amount of samples that may be taken while drilling and the difficulty in keeping the samples in a frozen state. Furthermore, analysis of these samples is time-consuming and laborious as well.

Another common form of evaluating petrophysical properties of formations is logging. Logging tools provide a variety of noninvasive evaluation techniques for evaluating formations and detecting hydrate presence. Unfortunately, conventional logging tools only provide limited information about a formation's petrophysical properties. Individual logging techniques often fail to accurately detect and accurately evaluate the nature and composition of subterranean formations and the hydrocarbon contained therein. Individual logging techniques are often susceptible to misinterpretation and are susceptible to false positives.

Moreover, often, only a limited number of logging tools are used in some wellbores. Therefore, in these situations petrophysical properties of a formation must be estimated with only a limited set of logging devices, which can be quite challenging.

Therefore, for all of these reasons, there is a need in the art for improved systems and methods that address one or more disadvantages of the prior art for assessing the petrophysical properties of formations, including performing a comprehensive analysis of hydrate presence in a formation.

SUMMARY

The present invention relates generally to methods and systems for evaluating petrophysical properties of subterranean formations. More particularly, but not by way of limitation, embodiments of the present invention include methods and systems for evaluating petrophysical properties of subterranean formations and comprehensive evaluation of hydrate presence through a combination of computer-implemented log modeling and analysis.

One example of a method for evaluating petrophysical properties of a subterranean formation comprises the steps of: receiving a sonic log, the sonic log having a plurality of sonic measurements at a plurality of wellbore depths; receiving an electrical resistivity log, the electrical resistivity log having a formation resistivity measurement at each wellbore depth; receiving a gamma ray log, the gamma ray log having a gamma ray measurement at each wellbore depth; receiving a neutron porosity log, the neutron porosity log having a neutron porosity measurement ($N_{PHI}$) at each wellbore depth; receiving a density log, the density log having a bulk density measurement ($\rho_{bulk-log}$) at each wellbore depth; determining a set of volumes, wherein the set of volumes comprise a hydrate volume ($V_{hydrate}$), a first water volume ($V_{H2O-1}$), a first shale volume ($V_{shale-1}$) and a matrix volume ($V_{matrix}$) wherein the set of volumes is determined at each wellbore depth by simultaneously solving a set of linearized tool response equations; determining a second shale volume ($V_{shale-2}$) at each wellbore depth based on the gamma ray measurements; determining a sonic porosity ($DT_{PHI}$) at each wellbore depth based on the sonic measurements; determining a calculated bulk density ($\rho_{bulk-calc}$) at each wellbore depth based on one of the first shale volume ($V_{H2O-1}$); the second shale volume ($V_{shale-2}$); the formation resistivity measurements; and the formation resistivity measurements and one of the first shale volume ($V_{shale-1}$) and the second shale volume ($V_{shale-2}$); determining a density porosity ($D_{PHI}$) at each wellbore depth based on one of calculated bulk density ($\rho_{bulk-calc}$) and bulk density measurement ($\rho_{bulk-log}$); determining an apparent water resistivity ($R_w$) at each wellbore depth based on the formation resistivity ($R_t$) and the density porosity ($D_{PHI}$); determining one of a water saturation ($S_w$), a second water volume ($V_{H2O-2}$), and an Archie hydrate saturation ($S_{h-Archie}$) at each wellbore depth based on the density porosities ($D_{PHI}$) and a water resistivity ($R_w$), wherein the water resistivity ($R_w$) is obtained from analysis of a formation sample or a log analysis; receiving an NMR log, the NMR log having an NMR porosity measurement ($NMR_{PHI}$) at each wellbore depth; determining an NMR hydrate saturation ($S_{h-NMR}$) wherein the step of determining the NMR hydrate saturation ($S_{h-NMR}$) at each wellbore depth is determined according to the relationship $$S_{h\text{-}NMR} = \frac{D_{PHI} - [NMR_{PHI}]}{D_{PHI} + \lambda \cdot [NMR_{PHI}]},$$

wherein $$\lambda = \frac{\rho_{fluid} - \rho_{hydrate}}{\rho_{matrix} - \rho_{fluid}},$$

wherein $\rho_{hydrate}$ is a hydrate density at each wellbore depth, wherein $\rho_{matrix}$ is a matrix density, and wherein $\rho_{fluid}$ is a formation fluid density; and determining a sonic hydrate saturation ($S_{h-DT}$) at each wellbore depth based on the sonic porosity ($DT_{PHI}$) and the density porosity ($D_{PHI}$).

One example of a method for evaluating petrophysical properties of a subterranean formation comprises the steps of: receiving a sonic log, the sonic log having a plurality of sonic measurements at a plurality of wellbore depths; receiving an electrical resistivity log, the electrical resistivity log having a formation resistivity measurement at each wellbore depth; receiving a gamma ray log, the gamma ray log having a gamma ray measurement at each wellbore depth; determining a second shale volume ($V_{shale-2}$) at each wellbore depth based on the gamma ray measurements; determining a sonic porosity ($DT_{PHI}$) at each wellbore depth based on the sonic measurements; determining a calculated bulk density ($\rho_{bulk-calc}$) at each wellbore depth based on one of the second shale volume ($V_{shale-2}$); the formation resistivity measurements; and the formation resistivity measurements and the second shale volume ($V_{shale-2}$); determining a density porosity ($D_{PHI}$) at each wellbore depth based on the calculated bulk density ($\rho_{bulk-calc}$); determining an apparent water resistivity ($R_w$) at each wellbore depth based on the formation resistivity ($R_t$) and the density porosity ($D_{PHI}$); determining one of a water saturation ($S_w$), a second water volume ($V_{H2O-2}$), and an Archie hydrate saturation ($S_{h-Archie}$) at each wellbore depth based on the density porosities ($D_{PHI}$) and a water resistivity ($R_w$), wherein the water resistivity ($R_w$) is obtained from a formation sample analysis or a log analysis; and determining a sonic hydrate saturation ($S_{h-DT}$) at each wellbore depth based on the sonic porosity ($DT_{PHI}$) and the density porosity ($D_{PHI}$).

One example of a method for evaluating petrophysical properties of a subterranean formation comprises the steps of:

receiving a sonic log, the sonic log having a plurality of sonic measurements at a plurality of wellbore depths; receiving an electrical resistivity log, the electrical resistivity log having a formation resistivity measurement at each wellbore depth; receiving a gamma ray log, the gamma ray log having a gamma ray measurement at each wellbore depth; receiving an NMR log, the NMR log having an NMR measurement (NM-$R_{PHI}$) at each wellbore depth; determining a second shale volume ($V_{shale-2}$) at each wellbore depth based on the gamma ray measurements; determining a sonic porosity ($DT_{PHI}$) at each wellbore depth based on the sonic measurements; determining a calculated bulk density ($\rho_{bulk-calc}$) at each wellbore depth based on one of the first shale volume ($V_{shale-1}$); the second shale volume ($V_{shale-2}$); the formation resistivity measurements; and the formation resistivity measurements and one of the first shale volume ($V_{shale-1}$) and the second shale volume ($V_{shale-2}$); determining a density porosity ($D_{PHI}$) at each wellbore depth based on one of calculated bulk density ($\rho_{bulk-calc}$) and bulk density measurement ($\rho_{bulk-log}$); determining an apparent water resistivity ($R_{wa}$) at each wellbore depth based on the formation resistivity measurements and the density porosity ($D_{PHI}$); determining one of a water saturation ($S_w$), a second water volume ($V_{H2O-2}$), and an Archie hydrate saturation ($S_{h-Archie}$) at each wellbore depth based on the density porosities ($D_{PHI}$) and a water resistivity ($R_w$), wherein the water resistivity ($R_w$) is obtained from a formation sample analysis or a log analysis; determining an NMR hydrate saturation wherein the step of determining the third hydrate saturation ($S_{h-NMR}$) at each wellbore depth is determined according to the relationship $$S_{h\text{-}NMR} = \frac{D_{PHI} - [NMR_{PHI}]}{D_{PHI} + \lambda \cdot [NMR_{PHI}]},$$

wherein $$\lambda = \frac{\rho_{fluid} - \rho_{hydrate}}{\rho_{matrix} - \rho_{fluid}},$$

wherein $\rho_{hydrate}$ is a hydrate density at each wellbore depth, wherein $\rho_{matrix}$ is a matrix density, and wherein $\rho_{fluid}$ is a formation fluid density.

One example of a method for evaluating petrophysical properties of subterranean formations comprises the steps of receiving a density log, the density log comprising a plurality of bulk density measurements ($\rho_{bulk-log}$) at a plurality of wellbore depths; receiving a sonic log, the sonic log having a sonic measurement at each wellbore depth; receiving an electrical resistivity log, the electrical resistivity log having a formation resistivity measurement at each wellbore depth; receiving a gamma ray log, the gamma ray log having a gamma ray measurement at each wellbore depth; determining a second shale volume ($V_{shale-2}$) at each wellbore depth based on the gamma ray measurements; determining a sonic porosity ($DT_{PHI}$) at each wellbore depth based on the sonic measurements; determining a density porosity ($D_{PHI}$) at each wellbore depth based on the bulk density measurements ($\rho_{bulk-log}$); determining an apparent water resistivity ($R_w$) at each wellbore depth based on the formation resistivity measurements and the density porosity ($D_{PHI}$); determining one of a water saturation ($S_w$), a second water volume ($V_{H2O-2}$), and an Archie hydrate saturation ($S_{h-Archie}$) at each wellbore depth based on the density porosities ($D_{PHI}$) and a water resistivity ($R_w$), wherein the water resistivity ($R_w$) is obtained from a formation sample analysis or a log analysis; and determining a sonic hydrate saturation ($S_{h-DT}$) at each wellbore depth based on the sonic porosity ($DT_{PHI}$) and the density porosity ($D_{PHI}$).

One example of an information handling system for evaluating petrophysical properties of subterranean formations, the system comprises: a processor operable to: receive a plurality of bulk density measurements ($\rho_{bulk-log}$) at a plurality of wellbore depths; receive a sonic measurement at each wellbore depth; receive a formation resistivity measurement at each wellbore depth; receive a gamma ray measurement at each wellbore depth; determine a second shale volume ($V_{shale-2}$) at each wellbore depth based on the gamma ray measurements; determine a sonic porosity ($DT_{PHI}$) at each wellbore depth based on the sonic measurements; determine a density porosity ($D_{PHI}$) at each wellbore depth based on the bulk density measurements ($\rho_{bulk-log}$); determine an apparent water resistivity ($R_w$) at each wellbore depth based on the formation resistivity measurements and the density porosity ($D_{PHI}$); determine one of a water saturation ($S_w$), a second water volume ($V_{H2O-2}$) and an Archie hydrate saturation ($S_{h-Archie}$) at each wellbore depth based on the density porosities ($D_{PHI}$) and a water resistivity ($R_w$), wherein the water resistivity ($R_w$) is obtained from a formation sample analysis or a log analysis; and determine a sonic hydrate saturation ($S_{h-DT}$) at each wellbore depth based on the sonic porosity ($DT_{PHI}$) and the density porosity ($D_{PHI}$); and a user interface adapted to display to the user an indication of the sonic hydrate saturation as a function of well bore depth.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein:

FIG. 3 also highlights intervals that contain potential and definite gas hydrates, based on analysis of the hydrate saturation logs.

Figure 1:
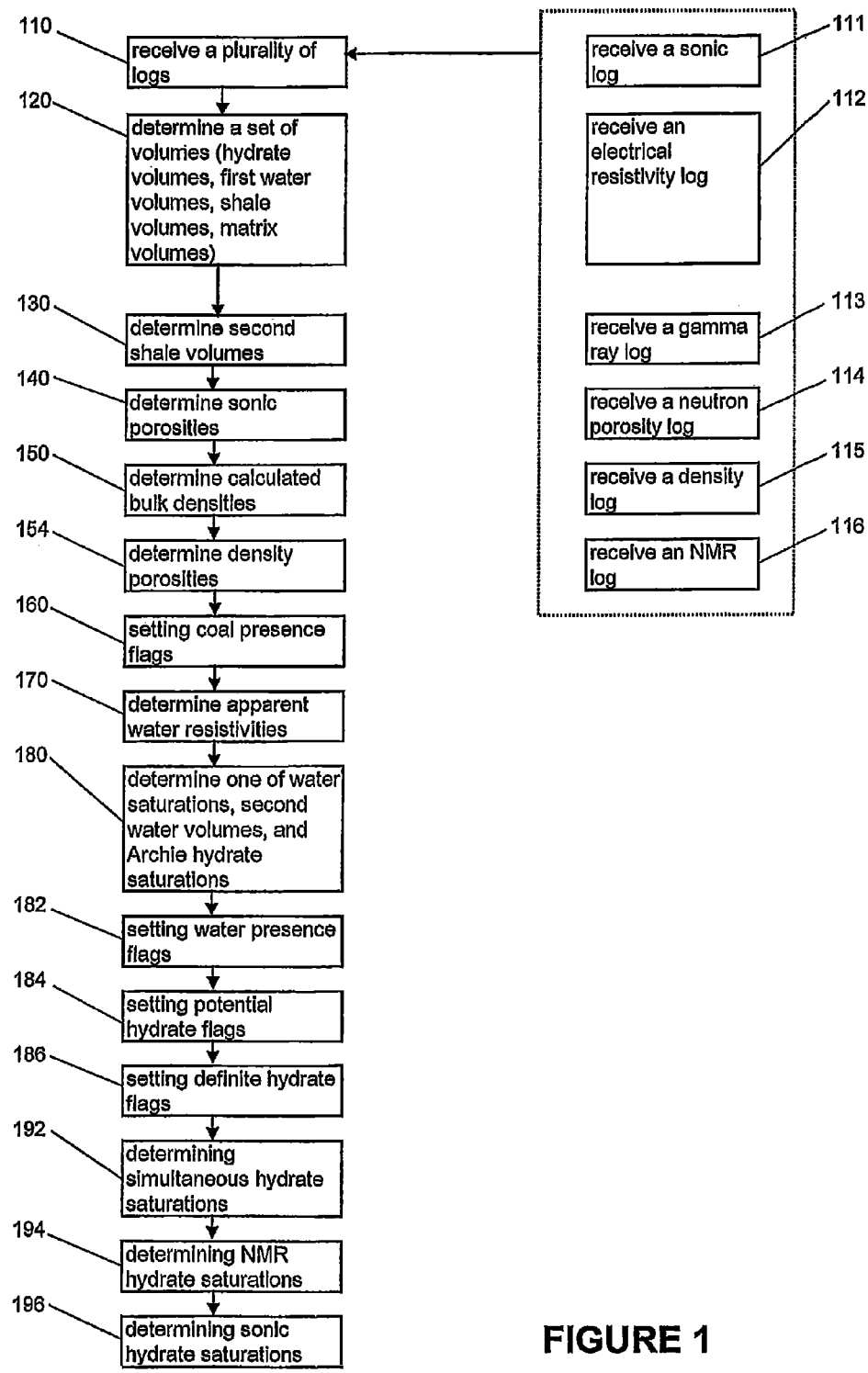
FIG. 1 illustrates a flow chart for a method for evaluating petrophysical properties of a subterranean formation in accordance with one embodiment of the present invention.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention relates generally to methods and systems for evaluating petrophysical properties of subterranean formations. More particularly, but not by way of limitation, embodiments of the present invention include methods and systems for evaluating petrophysical properties of subterranean formations and comprehensively evaluating hydrate presence through a combination of computer-implemented log modeling and analysis.

In certain embodiments, methods for evaluating petrophysical properties of a subterranean formation comprise the steps of running a number of logging tools in a wellbore to obtain a variety of wellbore data and logs, and evaluating and modeling the log data to ascertain various petrophysical properties.

Examples of suitable logging techniques that may be used in combination with the present invention include, but are not limited to, sonic logs, electrical resistivity logs, gamma ray logs, neutron porosity logs, density logs, or any combination or subset thereof. Not all logs are required for all embodiments disclosed herein. Examples of specific methods for analyzing and combining these logs to evaluate and assess petrophysical properties of formations are set forth below.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

FIG. 1 illustrates a flow chart for method 100 for evaluating petrophysical properties of a subterranean formation in accordance with one embodiment of the present invention.

Method 100 commences at step 110. In step 110, a plurality of logs or log data is received. Any two or more of the logs obtained in steps 111-116 may be used in combination with the steps disclosed herein. Examples of suitable logs which may be used include, but are not limited to, a sonic log (obtained in step 111), an electrical resistivity log (obtained in step 112), a gamma ray log (obtained in step 113), a neutron porosity log (obtained in step 114), a density log (obtained in step 115), an NMR log (obtained in step 116), or any combination or subset thereof. Each logging tool measures a response from the formation at a plurality of depths. Alternatively, in lieu of obtaining two of more of these wellbore logs, the log data may simply be received from another.

Typically, data measurements are logged or measured at regular intervals along the length of a wellbore. The term "wellbore depth," as used herein, refers to any longitudinal length of a wellbore including deviated and horizontal wellbores.

The sonic log measures sonic values ($DT_{log}$) at various wellbore depths; the electrical resistivity log measures formation resistivity values at various wellbore depths; the gamma ray log measures gamma ray values ($GR_{log}$) at various wellbore depths; the neutron porosity log measures neutron porosity values ($NPHI_{log}$) at various wellbore depths; the density log measures bulk density values ($\rho_{bulk-log}$) at various wellbore depths; and the NMR log measures $NMR_{PHI}$ values at various wellbore depths.

Each of these logs respond differently to the presence of hydrates. In particular, the electrical resistivity log (e.g. dual induction) shows a relatively high electrical resistivity deflection in a gas hydrate zone, compared to that of a water saturated horizon.

The sonic log registers a decrease in acoustic transit time within a gas hydrate-bearing zone in comparison to a unit saturated with either water or free gas. The neutron porosity log shows a slight increase in the neutron porosity in response to gas hydrates. This response contrasts with the apparent reduction in neutron porosity in a free-gas zone. The density log, on the other hand, shows a slight decrease in density within a gas hydrate compared to a unit saturated with water. NMR logs show a significant decrease in NMR porosity in known hydrate-bearing zones.

The two most easily-observable responses that are seen in known hydrate-bearing intervals are a large increase in the electrical resistivity and a large decrease in acoustic transit time. From a petrophysical perspective, hydrates are viewed as a part of the rock matrix because they are solid and support a shear wave, a property not shared with free natural gas, oil, or water. Acoustic compressional waves travel through hydrates faster than through gas or water, because sound waves propagate more quickly through a solid than through a fluid, resulting in a decrease in acoustic transit time. The neutron porosity and density responses are too slight to be diagnostic of gas hydrate without the electrical resistivity and acoustic travel time logs. The NMR log (along with others) is not always run and thus it is sometimes desired to be able to detect the presence of hydrate using other common downhole logs.

The following steps 120 through 196 describe the mathematical models and analysis which may be applied to combination of the logging data obtained in step 110. As will be apparent to a person of ordinary skill in the art with the benefit of this disclosure, not all steps are required by all embodiments of the present invention except where explicitly stated or inherently required by the methods described herein. Thus, each of the steps below is optional unless otherwise stated or inherently required.

In step 120, a set of linearized tool response equations is solved simultaneously to determine a set of volumes at each wellbore depth. The set of volumes determined comprise a hydrate volume ($V_{hydrate}$) a first water volume ($V_{H2O-1}$), a first shale volume ($V_{shale-1}$) and a matrix volume ($V_{matrix}$). As used herein, the term, "volume" of a component refers to the volume of a component normalized such that the total volume of all of the components sums to unity (i.e. 1). For example, under this definition, the term, "hydrate volume," refers to the volume of hydrate relative to the total rock volume, such that a hydrate volume of 1 would correspond to a rock composed of 100% hydrate.

The term, "linearized tool response equations," as used herein refer to the following equations:

$$\rho_{bulk-log} = \rho_{hydrate} \cdot V_{hydrate} + \rho_{shale} \cdot V_{shale-1} + \rho_{water} \cdot V_{water} + \rho_{matrix} \cdot V_{matrix};$$ [Equation 1]

$$NPHI_{log} = NPHI_{hydrate} \cdot V_{hydrate} + NPHI_{shale} \cdot V_{shale-1} + NPHI_{water} \cdot V_{water} + NPHI_{matrix} \cdot V_{matrix};$$ [Equation 2]

$$GR_{log} = GR_{hydrate} \cdot V_{hydrate} + GR_{shale} \cdot V_{shale-1} + GR_{water} \cdot V_{water} + GR_{matrix} \cdot V_{matrix};$$ [Equation 3]

$$DT_{log} = DT_{hydrate} \cdot V_{hydrate} + DT_{shale} \cdot V_{shale-1} + DT_{water} \cdot V_{water} + DT_{matrix} \cdot V_{matrix};$$ [Equation 4]

$$V_{hydrate} + V_{shale-1} + V_{water} + V_{matrix} = 1;$$ [Equation 5]

The term $\rho_{hydrate}$ as used herein refers to a hydrate density; $\rho_{shale}$ refers to a shale density; $\rho_{water}$ refers to a water density; and $\rho_{matrix}$ refers to a matrix density.

The term $NPHI_{hydrate}$ as used herein refers to a hydrate neutron porosity; $NPHI_{shale}$ refers to a shale neutron porosity;

$NPHI_{water}$ refers to a water neutron porosity; and $NPHI_{matrix}$ refers to a matrix neutron porosity.

The term $GR_{hydrate}$ as used herein refers to a hydrate gamma ray response; $GR_{shale}$ refers to a shale gamma ray measurement; $GR_{water}$ refers to a water gamma ray response; and $GR_{matrix}$ refers to a matrix gamma ray response.

The term $DT_{hydrate}$ as used herein refers to a hydrate sonic slowness; $DT_{shale}$ refers to a shale sonic slowness; $DT_{water}$ refers to a water sonic slowness; and $DT_{matrix}$ refers to a matrix sonic slowness.

In this way, hydrate, water, shale, and matrix volumes are calculated by solving a set of linearized tool response equations at each wellbore depth of interest, each term being evaluated at each wellbore depth. As apparent from the above description, the above-described set of linearized tool response equations is over-determined in that the set of equations comprise more equations than unknowns. Matrix algebra techniques called singular value decomposition (SVD) may be used to solve such over-determined systems of equations.

Alternatively, because the system is over-determined, any one of the linearized tool response equations may be omitted as desired. In certain embodiments, step 120 may be performed without resort to the neutron log obtained in step 114. In such an example, Equation 2 would be omitted from the tool response system of equations before solving for the desired unknown volumes.

Solution of the set of simultaneous equations requires knowledge of the response properties of the model constituents, for example the sonic slowness and density of water. These values can be readily found by reference to chart books published by logging service companies and text books on log analysis. Some of the properties, for example the component gamma-ray response values must be determined by trial and error.

In step 130, a second shale volume ($V_{shale-2}$) is determined at each wellbore depth of interest based on the gamma ray measurements at each wellbore depth. Whereas the first shale volume ($V_{shale-1}$) of step 120 is determined by resort to solving a system of linearized tool response equations, in step 130, the second shale volume ($V_{shale-2}$) is determined by reference to gamma ray measurements. A known relationship often exists between shale volumes and gamma ray measurements. Thus, one may determine a shale volume corresponding to a gamma ray measurement according to the known relationship. Occasionally, the known relationship may be a linear gamma index, although reference may be made to other known relationships, both linear and non-linear. These relationships are published in chart books published by logging service companies and text books on log analysis. For example, they can be found readily on the Internet. The relationships are applied such that depth points with low gamma-ray response and that are known from the other logs to correspond to sandstone layers are computed to have low or zero volume of shale. Similarly, depth points with high gamma-ray response and that are known from other logs to correspond to shale or other clay rich formations are computed to have volume of shale that is large, up to a value of 1.0.

Estimated shale volumes are useful in that they reveal details regarding the shale content of the formation at each of the wellbore depths of interest. For example, estimated shale volumes can reveal whether a given wellbore depth is primarily sand or shale. Additionally, estimated shale volumes may be used wherever a shale volume is required in any one or more of the steps described below. The first shale volume or the second shale volume may be used interchangeably as desired in any of the steps of the methods herein as desired.

In step 140, sonic porosities ($DT_{PHI}$) are determined at each wellbore depth of interest by reference to sonic measurements. In certain embodiments, the determination is made according to a known empirical correlation between sonic porosity ($DT_{PHI}$) and sonic measurement.

One method for computation of sonic porosity is based on a calculation where compressional velocity is estimated for a rock composed of rock matrix plus fluid-filled porosity. In this approach the hydrates, which behave as a solid, are considered part of the rock matrix. There are other approaches for calculation of sonic porosity, all of which will yield the fluid-filled porosity. These other approaches include the Wyllie time average, the Raymer, Hunt, Gardner model, the Schlumberger Field equation and others. These methods are presented in common text books and papers on log analysis.

The sonic porosities determined as part of step 140 may reveal the water-filled porosity at each of the wellbore depths. Notably, the sonic porosities are blind to any hydrates that may be present, in contrast to the density porosity (see e.g., step 154 below).

In step 150, calculated bulk densities are determined at each wellbore depth of interest. The calculated bulk densities ($\rho_{bulk-calc}$) at each wellbore depth are determined according to a known empirical correlation between bulk density and any one or both of: a second shale volume ($V_{shale-2}$) and a formation resistivity measurement.

Alternatively, the first shale volume ($V_{shale-1}$) may be used in lieu of the second shale volume ($V_{shale-2}$). While use of the second shale volume ($V_{shale-2}$) may be preferable in most cases, sometimes the second shale volume ($V_{shale-2}$) is unavailable due to the lack of a gamma ray log of the wellbore.

Whereas the first shale volume ($V_{shale-1}$) of step 120 is determined by resort to solving a system of linearized tool response equations, in step 130, the second shale volume ($V_{shale-2}$) is determined by reference to gamma ray measurements. The empirical relationship between the second shale volume ($V_{shale-2}$) and gamma ray measurements are readily available in the literature.

In step 154, density porosities ($D_{PHI}$) are determined at each wellbore depth of interest. In certain embodiments, the density porosity ($D_{PHI}$) at each wellbore depth is determined according to the relationship $$D_{PHI} = \left( \frac{\rho_{matrix} - \rho_{fluid}}{\rho_{bulk} - \rho_{matrix}} \right),$$

wherein $\rho_{matrix}$ is a matrix density of the formation and wherein $\rho_{fluid}$ is a formation fluid density of the formation. The term $\rho_{bulk}$ refers to bulk density for which one may use either a bulk density obtained from a density log ($\rho_{bulk-log}$) or a calculated bulk density ($\rho_{bulk-calc}$) such as from step 150 above, as desired.

Density porosity ($D_{PHI}$) includes the volume of hydrate added to the water-filled porosity, because the density of hydrate is similar to that of water and because hydrate volume is not included explicitly in the equation used to calculate $D_{PHI}$.

In step 160, a coal presence determination is made at each wellbore depth of interest. Where the method is computer-implemented, this coal presence determination may be referred to as setting a coal presence flag. In certain embodiments, a coal presence flag is set if both (a) a bulk density measurement ($\rho_{bulk-log}$) at each wellbore depth is below a first threshold and (b) a neutron porosity measurement ($N_{PHI}$) at each wellbore depth is above a second threshold. Alternatively, one may resort to using a calculated bulk density ($\rho_{bulk-calc}$) in lieu of bulk densities from a density log.

Suitable thresholds may be determined by joint examination of the bulk density and neutron porosity ($N_{phi}$) logs, for example, by cross plotting values of one log versus the other log, to identify outlying intervals that contain coal, if present. Examples of suitable first and second threshold values include, but are not limited to, values of bulk density of less than about 1.6 g/cc and values of $N_{phi}$ greater than about 0.5, according to values given in the literature, for example, service company chart books.

In step 170, apparent water resistivities ($R_w$) at each wellbore depth of interest are determined. The apparent water resistivities ($R_w$) are determined according to the relationship $$1 = \left(\frac{a \cdot R_w}{\varphi^m \cdot R_t}\right)^{\frac{1}{n}},$$

wherein a, m, and n are empirically derived parameters, $\varphi$ is porosity as a volume fraction, and $R_t$ is the formation resistivity. In certain embodiments, a is equal to 1, m is equal to 2, and n is equal to 2. In other embodiments, the empirically derived parameters a, m, and n are determined by laboratory measurements on representative rock samples, or by reference to published values.

Values of $R_{wap}$ in water-saturated sands will be assumed to be equal to the actual resistivity within the sands. If ice, hydrates, or hydrocarbons are present, $R_{wap}$ will be greater than the resistivity of the remaining water in the sands.

In step 180, one or more of the following is determined at each wellbore depth of interest: water saturation ($S_w$), a second water volume ($V_{H2O-2}$) and an Archie hydrate saturation ($S_{h-Archie}$). These values may be determined based on the formation resistivity ($R_t$) and the density porosity ($D_{PHI}$).

The water volume determined as part of step 180 is referred to as the second water volume ($V_{H2O-2}$) to distinguish it from the first water volume obtained above in step 120. In certain embodiments, these variables may be determined according to the relationships $$S_w = \left(\frac{a \cdot R_w}{\varphi^m \cdot R_t}\right)^{\frac{1}{n}}, S_W = \frac{V_{H_2O-2}}{D_{PHI}},$$

and $S_{h-Archie}$=1–$S_w$.

Given these relationships, one may determine one, two, or all three variables as desired from these equations. The water resistivity ($R_w$) is obtained from analysis of a formation sample or a log analysis, for example using the average value of $R_{wap}$ from a nearby water-saturated sand. The density porosity ($D_{PHI}$) may be obtained according to step 154 as described above.

There are some caveats to be aware of with this method. First, Archie's equation cannot differentiate between free gas, ice, and gas hydrate. Thus, the hydrate saturation values should be studied in conjunction with the downhole logs and gas content from mud logs to match the correct log responses with the correct type of water or hydrocarbon. This, however, does not create a significant problem, because the downhole log responses of gas hydrate are different from other hydrocarbons. Second, there are several empirical parameters (a, m, and n) and a well specific parameter ($R_w$) that must be determined. If a water saturated sand unit can be located (e.g.

$S_w$=1), a reasonable value for $R_w$ can be determined, ignoring the problems with salinity change during hydrate formation, which are not well understood. In empirical tests, varying $R_w$ by ±50% resulted in a negligible difference in hydrate saturation estimates. $R_w$ is an important value to know, yet there is some room for error in the estimate of $R_w$. Even though there are several parameters that need to be determined to utilize Archie's equation, they can be reasonably estimated from the downhole well logs. When compared to other conventional methods, Archie's equation proves to be a viable method for making reasonable estimates of hydrate saturation.

In step 182, a water presence determination is made at each wellbore depth of interest. Where the method is computer-implemented, this water presence determination may be referred to as setting a water presence flag. In certain embodiments, a water presence flag is set if the water saturation ($S_w$) at each wellbore depth is above a water saturation threshold value. Suitable thresholds may be determined by examination of computed hydrate saturation values and selecting a threshold value such that flagged intervals will be unlikely to contain hydrates. Examples of suitable threshold values include, but are not limited to, the range of about 0.6 to about 0.8.

In step 184, a potential hydrate presence determination is made at each wellbore depth of interest. Where the method is computer-implemented, this potential hydrate presence determination may be referred to as setting a potential hydrate presence flag. In certain embodiments, a potential hydrate presence flag is set if the Archie hydrate saturation ($S_{h-Archie}$) at each wellbore depth is above a first hydrate threshold value. Suitable first hydrate thresholds may be determined by selecting a value that is significantly larger than the noise level for the calculation of $S_{h-Archie}$ in water-saturated sands. Examples of suitable first hydrate threshold values include, but are not limited to, a value within the range of about 0.2 to about 0.3.

This is considered a potential hydrate indicator since the Archie hydrate saturation also responds to free-gas or even oil if present within the interval of interest.

In step 186, a definite hydrate presence determination is made at each wellbore depth of interest. Where the method is computer-implemented, this definite hydrate presence determination may be referred to as setting a definite hydrate presence flag. In certain embodiments, a definite hydrate presence flag is set if the Archie hydrate saturation ($S_{h-Archie}$) at each wellbore depth is above a second hydrate threshold value and one of the three hydrate saturations $S_{h-simultaneous}$, step 192; $S_{h-NMR}$, step 194; and $S_{h-DT}$, step 196, is above a third hydrate threshold value. Suitable second and third hydrate thresholds may be determined by selecting values that are significantly larger than the noise level for the calculation of $S_{h-Archie}$, $S_{h-simultaneous}$, $S_{h-NMR}$, or $S_{h-DT}$ in water-saturated sands. Examples of suitable second and third hydrate threshold values include, but are not limited to, the range of about 0.2 to about 0.4.

In step 192, a simultaneous hydrate saturation ($S_{h-simultaneous}$) is determined at each wellbore depth of interest. The hydrate saturation determined as part of step 192 is referred to here as "simultaneous" hydrate saturation to distinguish it from the other hydrate saturation determinations of the other steps herein, such as the Archie hydrate saturation ($S_{h-Archie}$) as part of step 180 above, the NMR hydrate saturation ($S_{h-NMR}$) as part of step 194 below, and the sonic hydrate saturation ($S_{h-DT}$) as part of step 196 below. In certain embodiments, the simultaneous hydrate saturation ($S_{h\text{-}simultaneous}$) may be determined according to the relationship $$S_{h\text{-}simultaneous} = \frac{V_{hydrate}}{V_{hydrate} + V_{H_2O\text{-}1}}.$$

If desired, the first water volume ($V_{H2O\text{-}1}$) may be replaced with the second water volume ($V_{H2O\text{-}2}$), such as when the first water volume ($V_{H2O\text{-}1}$) is not available due to the lack of a density log for example. The term "simultaneous" is used here to indicate that this hydrate saturation is determined with reference to the hydrate and water volumes obtained from the simultaneous equation solution methods of step 120 described above.

In step 194, NMR hydrate saturations ($S_{h\text{-}NMR}$) are determined based on NMR porosity measurements ($NMR_{PHI}$) at each wellbore depth of interest. This method requires only the NMR porosity and density logs to make an accurate estimate of hydrate saturation. Density porosity ($D_{PHI}$) is first calculated according to step 154 above. This NMR method is based on the fact that magnetic resonance porosity is much less than density porosity in hydrate zones, because the hydrate is not detected by NMR, thus hydrate saturation is calculated using the difference between the two logs.

In this way, NMR hydrate saturations ($S_{h\text{-}NMR}$) may be determined according to the relationship $$S_{h\text{-}NMR} = \frac{D_{PHI} - [NMR_{PHI}]}{D_{PHI} + \lambda \cdot [NMR_{PHI}]}.$$

The term $\lambda$ refers to the quantity $$\frac{\rho_{fluid} - \rho_{hydrate}}{\rho_{matrix} - \rho_{fluid}}.$$

The term $\rho_{hydrate}$ refers to a hydrate density at each wellbore depth; the term $\rho_{matrix}$ refers to a matrix density; and the term $\rho_{fluid}$ refers to a formation fluid density. These three component density values are normally considered as constants of any particular well or geologic region and would be determined by reference to the literature, for example, service company charts or textbooks on log analysis.

The biggest advantage to this method is that there are no well-specific parameters such as $R_w$ or pore aspect ratio and bulk and shear moduli in the sonic method, all of which can be difficult to determine a priori. The NMR method requires only densities, which are generally well known or may be looked up in textbooks.

In step 196, a sonic hydrate saturation ($S_{h\text{-}DT}$) is determined at each wellbore depth of interest. The sonic hydrate saturation ($S_{h\text{-}DT}$) is determined based on both the sonic porosity ($DT_{PHI}$) and the density porosity ($D_{PHI}$). Here, the separation of density porosity and sonic porosity provides a clear indicator of hydrate.

In certain embodiments, the sonic hydrate saturation ($S_{h\text{-}DT}$) may be determined according to the relationship $$S_{h\text{-}DT} = \frac{D_{PHI} - [DT_{PHI}]}{D_{PHI} + \lambda \cdot [DT_{PHI}]}.$$

The term $\lambda$ again refers to the quantity $$\frac{\rho_{fluid} - \rho_{hydrate}}{\rho_{matrix} - \rho_{fluid}}.$$

As before, the term $\rho_{hydrate}$ refers to a hydrate density at each wellbore depth. The term $\rho_{matrix}$ refers to a matrix density. The term $\rho_{fluid}$ refers to a formation fluid density. These three component density values are normally considered as constants of any particular well or geologic region and would be determined by reference to the literature, for example, service company charts or textbooks on log analysis.

Results of this step appear to underestimate hydrate saturation by as much as 20%. This underestimation is a direct result of this method being a two end-member model (sand and shale). The sonic porosity is not equal to the NMR porosity and thus this step does not make a correct estimate of hydrate saturation from sonic porosity. Since the sonic tool "sees" hydrates as part of the matrix and not a pore-filling fluid, the model is unable to account for all of the hydrate present. The sonic porosity method is an accurate identifier of hydrate intervals and is a powerful tool for parsing out noise in other methods, because the sonic porosity model makes more conservative hydrate saturation estimates and is less prone to identifying false hydrate. In addition, this step has utility beyond hydrate saturation estimates and can be used for several different purposes in other wells.

Alternate approaches for computing the sonic porosity $DT_{phi}$ might not have this problem of underestimating $S_{h\text{-}DT}$.

Certain embodiments of the present invention may determine one or more of the possible hydrate saturations described herein, that is, the simultaneous hydrate saturation ($S_{h\text{-}simultaneous}$) the Archie hydrate saturation ($S_{h\text{-}Archie}$) the NMR hydrate saturation ($S_{h\text{-}NMR}$) and the sonic hydrate saturation ($S_{h\text{-}DT}$). Each of the hydrate saturations determined by the methods herein may be determined independently and compared to one another as desired. For example, depending on which logs are available for a given wellbore, in certain embodiments, it may be desired to determine NMR hydrate saturation ($S_{h\text{-}NMR}$) without determining a sonic hydrate saturation ($S_{h\text{-}DT}$). Such a determination would be possible without a sonic log if an NMR log is available for example.

It is explicitly recognized that any of the elements and features of each of the devices described herein are capable of use with any of the other devices described herein with no limitation. Furthermore, it is explicitly recognized that the steps of the methods herein may be performed in any order except unless explicitly stated otherwise or inherently required otherwise by the particular method.

The methods herein may be implemented via an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components To facilitate a better understanding of the present invention, the following examples of certain embodiments are given. In no way should the following examples be read to limit, or define, the scope of the invention.

EXAMPLES

Figure 2:
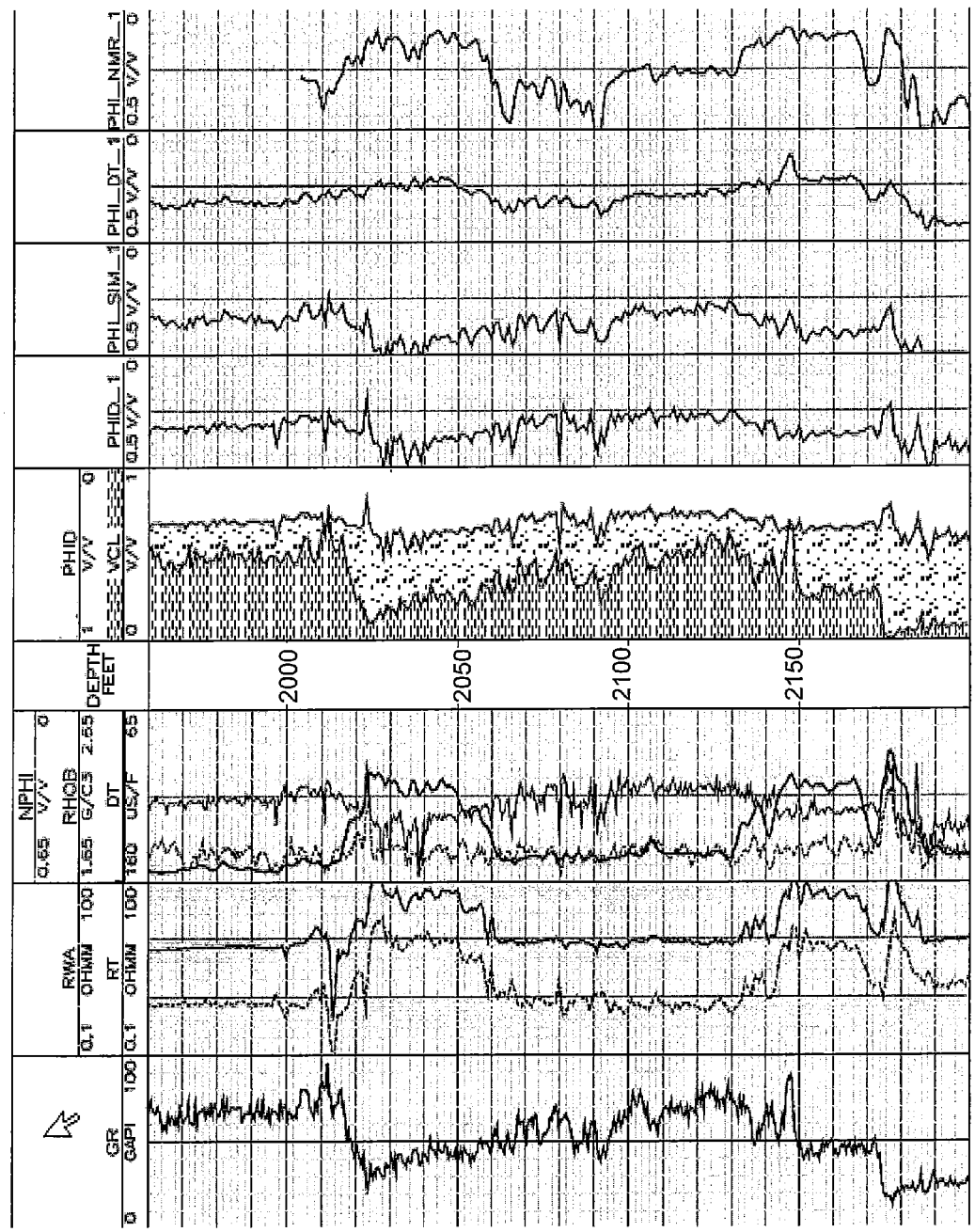
FIG. 2 shows recorded wireline logs and computed porosity logs plotted versus depth for a sample set of calculations of a representative wellbore.

FIG. 2 shows recorded wireline logs and computed porosity logs plotted versus depth for a sample set of calculations of a representative test wellbore. The first track (starting on the left) shows the recorded gamma-ray log. The second track shows the recorded resistivity log and the apparent water resistivity $R_{wap}$ computed according to step 170. The third track shows recorded neutron porosity $N_{PHI}$, bulk density RHOB, and compressional sonic travel time DT logs. Note the anomalous behavior of the DT log compared to the RHOB and $N_{PHI}$ in the intervals that contain hydrate. The shaded logs in the middle of the figure show shale volume (210), sand volume (220), and porosity (230).

The four tracks on the right hand side of FIG. 2 show computed porosity curves. The first porosity track shows the density porosity PHID computed according to step 154. The second porosity track shows the simultaneous solution porosity according to step 120. The third porosity track shows porosity computed using the sonic log according to step 140. The fourth porosity track shows the recorded NMR porosity log. The NMR porosity and the sonic porosity both show lower values of porosity in the intervals containing hydrate.

Figure 3:
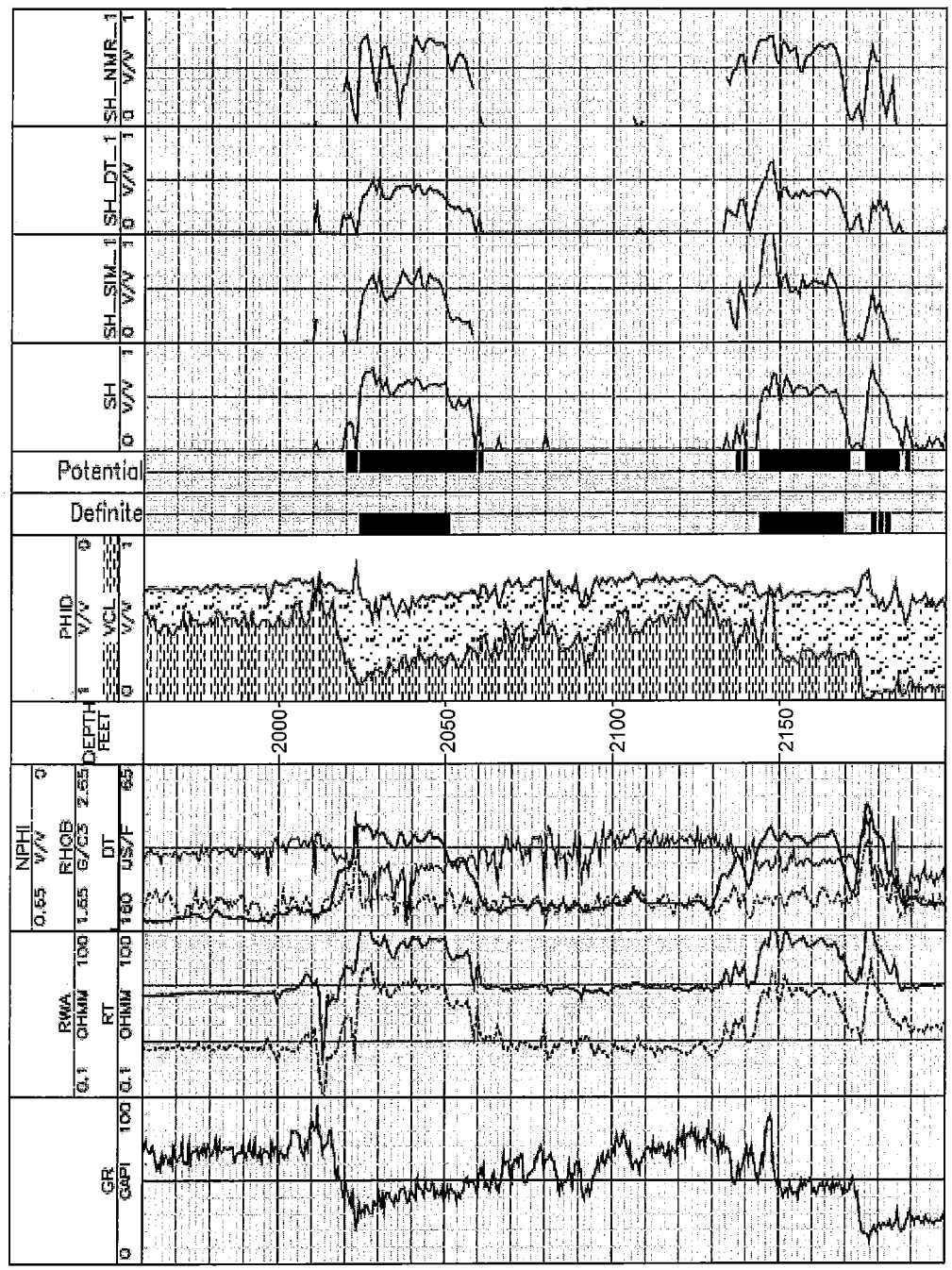
FIG. 3 shows recorded wireline logs and computed hydrate saturation logs, as a percentage of total pore space, plotted versus depth for a sample set of calculations for the same representative well bore as shown in FIG. 2.

FIG. 3 shows the same interval as shown in FIG. 2. In particular, FIG. 3 shows recorded wireline logs and computed hydrate saturation logs, as a percentage of total pore space, plotted versus depth for a sample set of calculations for the same representative well bore as shown in FIG. 2. FIG. 3 also highlights intervals that contain potential and definite gas hydrates, based on analysis of the hydrate saturation logs.

The recorded logs are repeated on the left-hand side of the plot. The two narrow tracks just to the right of the lithology track show the potential (260) and definite (270) hydrate flags. The four tracks on the right hand side of FIG. 2 show computed hydrate saturation curves. The first is hydrate saturation computed using Archie's equation according to step 180. The second shows hydrate saturation obtained from the simultaneous solution according to step 192. The third shows hydrate saturation computed using the sonic porosity according to step 196, and the final track (furthest to the right) shows hydrate saturation based on the NMR porosity log according to step 194.

The examples shown here in FIGS. 2 and 3 clearly show the ability of the invention described herein for determining hydrate saturation using the various approaches described above. The Archie's hydrate saturation is accurate, but cannot distinguish between free-gas and hydrates. The sonic hydrate saturation clearly shows the presence of hydrate, but as computed in this example, records hydrate saturation that is low compared to the other hydrate logs. The simultaneous solution is also diagnostic, but more sensitive to noise in the input logs. The NRM solution is also accurate, but not always possible since NRM logs are not always acquired.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations and equivalents are considered within the scope and spirit of the present invention.

What is claimed is:

1. A method for evaluating petrophysical properties of a subterranean formation comprising the steps of:
    receiving a sonic log, the sonic log having a plurality of sonic measurements at a plurality of wellbore depths;
    receiving an electrical resistivity log, the electrical resistivity log having a formation resistivity measurement at each wellbore depth;
    receiving a gamma ray log, the gamma ray log having a gamma ray measurement at each wellbore depth;
    receiving a neutron porosity log, the neutron porosity log having a neutron porosity measurement ($N_{PHI}$) at each wellbore depth;
    receiving a density log, the density log having a bulk density measurement ($\rho_{bulk-log}$) at each wellbore depth;
    determining a set of volumes, wherein the set of volumes comprise a hydrate volume ($V_{hydrate}$), a first water volume ($V_{H2O-1}$), a first shale volume ($V_{shale-1}$), and a matrix volume ($V_{matrix}$), wherein the set of volumes is determined at each wellbore depth by simultaneously solving a set of linearized tool response equations;
    determining a second shale volume ($V_{shale-2}$) at each wellbore depth based on the gamma ray measurements;
    determining a sonic porosity ($DT_{PHI}$) at each wellbore depth based on the sonic measurements;
    determining a calculated bulk density ($\rho_{bulk-calc}$) at each wellbore depth based on one of the first shale volume ($V_{shale-1}$); the second shale volume ($V_{shale-2}$); the formation resistivity measurements; and the formation resistivity measurements and one of the first shale volume ($V_{shale-1}$) and the second shale volume ($V_{shale-2}$);
    determining a density porosity ($D_{PHI}$) at each wellbore depth based on one of calculated bulk density ($\rho_{bulk-calc}$) and bulk density measurement ($\rho_{bulk-log}$);
    determining an apparent water resistivity ($R_w$) at each wellbore depth based on the formation resistivity ($R_t$) and the density porosity ($D_{PHI}$);
    determining one of a water saturation ($S_w$), a second water volume ($V_{H2O-2}$), and an Archie hydrate saturation ($S_{h-Archie}$) at each wellbore depth based on the density porosities ($D_{PHI}$) and a water resistivity ($R_w$), wherein the water resistivity ($R_w$) is obtained from analysis of a formation sample or a log analysis;
    receiving an NMR log, the NMR log having an NMR porosity measurement ($NMR_{PHI}$) at each wellbore depth;
    determining an NMR hydrate saturation ($S_{h-NMR}$) wherein the step of determining the NMR hydrate saturation ($S_{h-NMR}$) at each wellbore depth is determined according to the relationship $$S_{h-NMR} = \frac{D_{PHI} - [NMR_{PHI}]}{D_{PHI} + \lambda \cdot [NMR_{PHI}]},$$

wherein $$\lambda = \frac{\rho_{fluid} - \rho_{hydrate}}{\rho_{matrix} - \rho_{field}},$$

wherein $\rho_{hydrate}$ is a hydrate density at each wellbore depth, wherein $\rho_{matrix}$ is a matrix density, and wherein $\rho_{fluid}$ is a formation fluid density; and determining a sonic hydrate saturation ($S_{h\text{-}DT}$) at each wellbore depth based on the sonic porosity ($DT_{PHI}$) and the density porosity ($D_{PHI}$).

2. The method of claim 1 further comprising the steps of:
setting a coal presence flag at each wellbore depth if both (a) the bulk density measurement ($\rho_{bulk\text{-}log}$) at each wellbore depth is below a first threshold and (b) the neutron porosity measurement ($N_{PHI}$) at each wellbore depth is above a second threshold;
determining a simultaneous hydrate saturation ($S_{h\text{-}simultaneous}$) according to the relationship $$S_{h\text{-}simultaneous} = \frac{V_{hydate}}{V_{hydate} + V_{H_2O\text{-}1}};$$

setting a water flag at each wellbore depth if the water saturation at each wellbore depth is above a first water threshold;
setting a potential hydrate presence flag at each wellbore depth if the Archie hydrate saturation at each wellbore depth is above a first hydrate threshold; and
setting a definite hydrate presence flag at each wellbore depth if the Archie hydrate saturation ($S_{h\text{-}Archie}$) is above a second hydrate threshold, and one of the sonic hydrate saturation ($S_{h\text{-}DT}$), the NMR hydrate saturation ($S_{h\text{-}NMR}$), and the simultaneous hydrate saturation ($S_{h\text{-}simultaneous}$) at each wellbore depth is above a third hydrate threshold.

3. A method for evaluating petrophysical properties of a subterranean formation comprising the steps of:
receiving a sonic log, the sonic log having a plurality of sonic measurements at a plurality of wellbore depths;
receiving an electrical resistivity log, the electrical resistivity log having a formation resistivity measurement at each wellbore depth;
receiving a gamma ray log, the gamma ray log having a gamma ray measurement at each wellbore depth;
determining a second shale volume ($V_{shale\text{-}2}$) at each wellbore depth based on the gamma ray measurements;
determining a sonic porosity ($DT_{PHI}$) at each wellbore depth based on the sonic measurements;
determining a calculated bulk density ($\rho_{bulk\text{-}calc}$) at each wellbore depth based on one of the second shale volume ($V_{shale\text{-}2}$); the formation resistivity measurements; and the formation resistivity measurements and the second shale volume ($V_{shale\text{-}2}$);
determining a density porosity ($D_{PHI}$) at each wellbore depth based on the calculated bulk density ($\rho_{bulk\text{-}calc}$);
determining an apparent water resistivity ($R_w$) at each wellbore depth based on the formation resistivity ($R_t$) and the density porosity ($D_{PHI}$);
determining one of a water saturation ($S_w$), a second water volume ($V_{H2O\text{-}2}$), and an Archie hydrate saturation ($S_{h\text{-}Archie}$) at each wellbore depth based on the density porosities ($D_{PHI}$) and a water resistivity ($R_w$), wherein the water resistivity ($R_w$) is obtained from a formation sample analysis or a log analysis; and
determining a sonic hydrate saturation ($S_{h\text{-}DT}$) at each wellbore depth based on the sonic porosity ($DT_{PHI}$) and the density porosity ($D_{PHI}$).

4. The method of claim 3 wherein the step of determining the second shale volume ($V_{shale\text{-}2}$) is determined according to a linear gamma index.

5. The method of claim 3 wherein the step of determining the sonic porosity ($DT_{PHI}$) is determined according to a known empirical correlation between sonic porosity ($DT_{PHI}$) and sonic measurement.

6. The method of claim 3 wherein the step of determining the bulk density ($\rho_{bulk\text{-}calc}$) is determined according to a known relationship between the density porosity ($D_{PHI}$) and one of the second shale volume ($V_{shale\text{-}2}$) and the formation resistivity measurements.

7. The method of claim 3 wherein the step of determining the density porosity ($D_{PHI}$) at each wellbore depth is determined according to the relationship $\rho_{bulk\text{-}calc} = \rho_{matrix} - D_{PHI}(\rho_{matrix} - \rho_{fluid})$, wherein $\rho_{matrix}$ is a matrix density of the formation and wherein $\rho_{fluid}$ is a formation fluid density of the formation.

8. The method of claim 3 wherein the step of determining the apparent water resistivity ($R_w$) is determined according to the relationship $$1 = \left(\frac{a \cdot R_w}{\varphi^m \cdot R_t}\right)^{\frac{1}{n}},$$

wherein a, m, and n are empirically derived parameters, $\phi$ is porosity as a volume fraction, and $R_t$ is the formation resistivity.

9. The method of claim 8 wherein the step of determining one of the water saturation ($S_w$), the second water volume ($V_{H2O\text{-}2}$), and the Archie hydrate saturation ($S_{h\text{-}Archie}$) at each wellbore depth is determined according to the relationships $$S_w = \left(\frac{a \cdot R_w}{\varphi^m \cdot R_t}\right)^{\frac{1}{n}}, \quad S_W = \frac{V_{H_2O\text{-}2}}{D_{PHI}},$$

and $S_{h\text{-}Archie} = 1 - S_W$.

10. The method of claim 9 further comprising the step of determining the water saturation ($S_w$), the second water volume ($V_{H2O\text{-}2}$), and the Archie hydrate saturation ($S_{h\text{-}Archie}$) at each wellbore depth.

11. The method of claim 3 further comprising the step of setting a water flag at each wellbore depth if the water saturation ($S_W$) at each wellbore depth is above a first water threshold.

12. The method of claim 3 further comprising the step of setting a potential hydrate presence flag at each wellbore depth if the Archie hydrate saturation ($S_{h\text{-}Archie}$) at each wellbore depth is above a first hydrate threshold.

13. The method of claim 3 further comprising the step of setting a definite hydrate presence flag at each wellbore depth if the Archie hydrate saturation ($S_{h\text{-}Archie}$) is above a first hydrate threshold, and one of the sonic hydrate saturation ($S_{h\text{-}DT}$), the NMR hydrate saturation ($S_{h\text{-}NMR}$), and the simultaneous hydrate saturation ($S_{h\text{-}simultaneous}$) is above a second hydrate threshold.

14. The method of claim 3 wherein the step of determining the sonic hydrate saturation ($S_{h\text{-}DT}$) at each wellbore depth is determined according to the relationship $$S_{h\text{-}DT} = \frac{D_{PHI} - [DT_{PHI}]}{D_{PHI} + \lambda \cdot [DT_{PHI}]}$$

wherein $$\lambda = \frac{\rho_{fluid} - \rho_{hydrate}}{\rho_{matrix} - \rho_{fluid}},$$

wherein $\rho_{hydrate}$ is a hydrate density at each wellbore depth, wherein $\rho_{matrix}$ is a matrix density, and wherein $\rho_{fluid}$ is a formation fluid density.

15. The method of claim 3 further comprising:
receiving an NMR log, the NMR log having an NMR measurement ($NMR_{PHI}$) at each wellbore depth; and
determining a third hydrate saturation wherein the step of determining the NMR hydrate saturation ($S_{h\text{-}NMR}$) at each wellbore depth is determined according to the relationship $$S_{h\text{-}NMR} = \frac{D_{PHI} - [NMR_{PHI}]}{D_{PHI} + \lambda \cdot [NMR_{PHI}]},$$

wherein $$\lambda = \frac{\rho_{fluid} - \rho_{hydrate}}{\rho_{matrix} - \rho_{fluid}},$$

wherein $\rho_{hydrate}$ is a hydrate density at each wellbore depth, wherein $\rho_{matrix}$ is a matrix density, and wherein $\rho_{fluid}$ is a formation fluid density.

16. The method of claim 3 further comprising the steps of:
receiving a neutron porosity log, the neutron porosity log having a neutron porosity measurement ($N_{PHI}$) at each wellbore depth;
receiving a density log, the density log having a bulk density measurement ($\rho_{bulk\text{-}log}$) at each wellbore depth; and
determining a set of volumes, wherein the set of volumes comprise a hydrate volume ($V_{hydrate}$), a water volume ($V_{H2O}$), a first shale volume ($V_{shale\text{-}1}$), and a matrix volume ($V_{matrix}$), wherein the set of volumes is determined at each wellbore depth by simultaneously solving a set of linearized tool response equations.

17. The method of claim 16 wherein the linearized tool response equations comprise the following equations:

$$\rho_{bulk\text{-}log} = \rho_{hydrate} \cdot V_{hydrate} + \rho_{shale} \cdot V_{shale\text{-}1} + \rho_{water} \cdot V_{water} + \rho_{matrix} \cdot V_{matrix};$$

$$NPHI_{log} = NPHI_{hydrate} \cdot V_{hydrate} + NPHI_{shale} \cdot V_{shale\text{-}1} + NPHI_{water} \cdot V_{water} + NPHI_{matrix} \cdot V_{matrix};$$

$$GR_{log} = GR_{hydrate} \cdot V_{hydrate} + GR_{shale} \cdot V_{shale\text{-}1} + GR_{water} \cdot V_{water} + GR_{matrix} \cdot V_{matrix};$$

$$DT_{log} = DT_{hydrate} \cdot V_{hydrate} + DT_{shale} \cdot V_{shale\text{-}1} + DT_{water} \cdot V_{water} + DT_{matrix} \cdot V_{matrix};$$

and $$V_{hydrate} + V_{shale\text{-}1} + V_{water} + V_{matrix} = 1;$$

wherein $\rho_{hydrate}$ is a hydrate density, $\rho_{shale}$ is a shale density, $\rho_{water}$ is a water density, $\rho_{matrix}$ is a matrix density;
wherein $NPHI_{hydrate}$ is a hydrate neutron porosity, $NPHI_{shale}$ is a shale neutron porosity, $NPHI_{water}$ is a water neutron porosity, $NPHI_{matrix}$ is a matrix neutron porosity;
wherein $GR_{hydrate}$ is a hydrate gamma ray response, $GR_{shale}$ is a shale gamma ray response, $GR_{water}$ is i a water gamma ray response, $GR_{matrix}$ is a matrix gamma ray response; and
wherein $DT_{hydrate}$ is a hydrate sonic slowness, $DT_{shale}$ is a shale sonic slowness, $DT_{water}$ is a water sonic slowness, and $DT_{matrix}$ is a matrix sonic slowness.

18. The method of claim 3 further comprising the steps of:
receiving a density log, the density log having a bulk density measurement ($\rho_{bulk\text{-}log}$) at each wellbore depth; and
determining a set of volumes, wherein the set of volumes comprise a hydrate volume ($V_{hydrate}$), a first water volume ($V_{H2O\text{-}1}$), a first shale volume ($V_{shale\text{-}1}$), and a matrix volume ($V_{matrix}$), wherein the set of volumes is determined at each wellbore depth by simultaneously solving a set of linearized tool response equations.

19. The method of claim 18 wherein the set of linearized tool response equations comprise the following equations:

$$\rho_{bulk\text{-}log} = \rho_{hydrate} \cdot V_{hydrate} + \rho_{shale} \cdot V_{shale\text{-}1} + \rho_{water} \cdot V_{water} \rho_{matrix} \cdot V_{matrix};$$

$$GR_{log} = GR_{hydrate} \cdot V_{hydrate} + GR_{shale} \cdot V_{shale\text{-}1} + GR_{water} \cdot V_{water} + GR_{matrix} \cdot V_{matrix};$$

$$DT_{log} = DT_{hydrate} \cdot V_{hydrate} + DT_{shale} \cdot V_{shale\text{-}1} + DT_{water} \cdot V_{water} + DT_{matrix} \cdot V_{matrix};$$

and $$V_{hydrate} + V_{shale\text{-}1} + V_{water} + V_{matrix} = 1;$$

wherein $\rho_{hydrate}$ is a hydrate density, $\rho_{shale}$ is a shale density, $\rho_{water}$ is a water density, $\rho_{matrix}$ is a matrix density;
wherein $GR_{hydrate}$ is a hydrate gamma ray response, $GR_{shale}$ is a shale gamma ray response, $GR_{water}$ is i a water gamma ray response, $GR_{matrix}$ is a matrix gamma ray response; and
wherein $DT_{hydrate}$ is a hydrate sonic slowness, $DT_{shale}$ is a shale sonic slowness, $DT_{water}$ is a water sonic slowness, and $DT_{matrix}$ is a matrix sonic slowness.

20. The method of claim 3 determining a calculated bulk density ($\rho_{bulk\text{-}calc}$) at each wellbore depth based on one of the first shale volume ($V_{shale\text{-}1}$); the second shale volume ($V_{shale\text{-}2}$); the formation resistivity measurements; and the formation resistivity measurements and one of the first shale volume ($V_{shale\text{-}1}$) and the second shale volume ($V_{shale\text{-}2}$).

21. The method of claim 3 further comprising the steps of:
receiving a density log, the density log comprising a bulk density measurement ($\rho_{bulk\text{-}log}$) at each wellbore depth;
receiving a neutron porosity log, the neutron porosity log having a neutron porosity measurement ($N_{PHI}$) at each wellbore depth; and
setting a coal presence flag at each wellbore depth if both (a) the bulk density measurement ($\rho_{bulk\text{-}log}$) is below a first threshold and (b) the neutron porosity measurement ($N_{PHI}$) is above a second threshold.

22. The method of claim 17 further comprising the step of determining a third hydrate saturation ($S_{h\text{-}simultaneous}$) according to the relationship $$S_{h\text{-}simultaneous} = \frac{V_{hydate}}{V_{hydate} + V_{H_2O}}.$$

23. The method of claim 3 further comprising the steps of:
logging a wellbore to obtain the electrical resistivity log;
logging the wellbore to obtain the sonic log and
logging the wellbore to obtain the gamma ray log.

24. The method of claim 16 further comprising the steps of:
logging a wellbore to obtain the neutron porosity log; and
logging a wellbore to obtain the density log.

25. A method for evaluating petrophysical properties of a subterranean formation comprising the steps of:
receiving a sonic log, the sonic log having a plurality of sonic measurements at a plurality of wellbore depths;
receiving an electrical resistivity log, the electrical resistivity log having a formation resistivity measurement at each wellbore depth;
receiving a gamma ray log, the gamma ray log having a gamma ray measurement at each wellbore depth;
receiving an NMR log, the NMR log having an NMR measurement ($NMR_{PHI}$) at each wellbore depth;
determining a second shale volume ($V_{shale\text{-}2}$) at each wellbore depth based on the gamma ray measurements;
determining a sonic porosity ($DT_{PHI}$) at each wellbore depth based on the sonic measurements;
determining a calculated bulk density ($\rho_{bulk\text{-}calc}$) at each wellbore depth based on one of the first shale volume ($V_{shale\text{-}1}$); the second shale volume ($V_{shale\text{-}2}$); the formation resistivity measurements; and the formation resistivity measurements and one of the first shale volume ($V_{shale\text{-}1}$) and the second shale volume ($V_{shale\text{-}2}$);
determining a density porosity ($D_{PHI}$) at each wellbore depth based on one of calculated bulk density ($\rho_{bulk\text{-}calc}$) and bulk density measurement ($\rho_{bulk\text{-}log}$);
determining an apparent water resistivity ($R_{wa}$) at each wellbore depth based on the formation resistivity measurements and the density porosity ($D_{PHI}$);
determining one of a water saturation ($S_w$), a second water volume ($V_{H2O\text{-}2}$), and an Archie hydrate saturation ($S_{h\text{-}Archie}$) at each wellbore depth based on the density porosities ($D_{PHI}$) and a water resistivity ($R_w$), wherein the water resistivity ($R_w$) is obtained from a formation sample analysis or a log analysis;
determining an NMR hydrate saturation wherein the step of determining the third hydrate saturation ($S_{h\text{-}NMR}$) at each wellbore depth is determined according to the relationship $$S_{h\text{-}NMR} = \frac{D_{PHI} - [NMR_{PHI}]}{D_{PHI} + \lambda \cdot [NMR_{PHI}]},$$

wherein $$\lambda = \frac{\rho_{fluid} - \rho_{hydrate}}{\rho_{matrix} - \rho_{fluid}},$$

wherein $\rho_{hydrate}$ is a hydrate density at each wellbore depth, wherein $\rho_{matrix}$ is a matrix density, and wherein $\rho_{fluid}$ is a formation fluid density.

26. The method of claim 25 further comprising the step of setting a water flag at each wellbore depth if the water saturation is above a first water threshold.

27. The method of claim 25 further comprising the step of setting a potential hydrate presence flag at each wellbore depth if the Archie hydrate saturation at each wellbore depth is above a first hydrate threshold.

28. The method of claim 25 further comprising the step of setting a definite hydrate presence flag at each wellbore depth if the Archie hydrate saturation ($S_{h\text{-}Archie}$) is above a second hydrate threshold, and one of the sonic hydrate saturation ($S_{h\text{-}DT}$), the NMR hydrate saturation ($S_{h\text{-}NMR}$), and the simultaneous hydrate saturation ($S_{h\text{-}simultaneous}$) at each wellbore depth is above a third hydrate threshold.

29. A method for evaluating petrophysical properties of subterranean formations comprising the steps of:
receiving a density log, the density log comprising a plurality of bulk density measurements ($\rho_{bulk\text{-}log}$) at a plurality of wellbore depths;
receiving a sonic log, the sonic log having a sonic measurement at each wellbore depth;
receiving an electrical resistivity log, the electrical resistivity log having a formation resistivity measurement at each wellbore depth;
receiving a gamma ray log, the gamma ray log having a gamma ray measurement at each wellbore depth;
determining a second shale volume ($V_{shale\text{-}2}$) at each wellbore depth based on the gamma ray measurements;
determining a sonic porosity ($DT_{PHI}$) at each wellbore depth based on the sonic measurements;
determining a density porosity ($D_{PHI}$) at each wellbore depth based on the bulk density measurements ($\rho_{bulk\text{-}log}$);
determining an apparent water resistivity ($R_w$) at each wellbore depth based on the formation resistivity measurements and the density porosity ($D_{PHI}$);
determining one of a water saturation ($S_w$), a second water volume ($V_{H2O\text{-}2}$), and an Archie hydrate saturation ($S_{h\text{-}Archie}$) at each wellbore depth based on the density porosities ($D_{PHI}$) and a water resistivity ($R_w$), wherein the water resistivity ($R_w$) is obtained from a formation sample analysis or a log analysis; and
determining a sonic hydrate saturation ($S_{h\text{-}DT}$) at each wellbore depth based on the sonic porosity ($DT_{PHI}$) and the density porosity ($D_{PHI}$).

30. An information handling system for evaluating petrophysical properties of subterranean formations, the system comprising:
a processor operable to:
receive a plurality of bulk density measurements ($\rho_{bulk\text{-}log}$) at a plurality of wellbore depths;
receive a sonic measurement at each wellbore depth;
receive a formation resistivity measurement at each wellbore depth;
receive a gamma ray measurement at each wellbore depth;
determine a second shale volume ($V_{shale\text{-}2}$) at each wellbore depth based on the gamma ray measurements;
determine a sonic porosity ($DT_{PHI}$) at each wellbore depth based on the sonic measurements;
determine a density porosity ($D_{PHI}$) at each wellbore depth based on the bulk density measurements ($\rho_{bulk\text{-}log}$);
determine an apparent water resistivity ($R_w$) at each wellbore depth based on the formation resistivity measurements and the density porosity ($D_{PHI}$);
determine one of a water saturation ($S_w$), a second water volume ($V_{H2O\text{-}2}$), and an Archie hydrate saturation ($S_{h\text{-}Archie}$) at each wellbore depth based on the density porosities ($D_{PHI}$) and a water resistivity ($R_w$), wherein the water resistivity ($R_w$) is obtained from a formation sample analysis or a log analysis; and determine a sonic hydrate saturation ($S_{h\text{-}DT}$) at each wellbore depth based on the sonic porosity ($DT_{PHI}$) and the density porosity ($D_{PHI}$); and a user interface adapted to display to the user an indication of the sonic hydrate saturation as a function of well bore depth.

* * * * *